United States Patent Office 3,521,779
Patented July 28, 1970

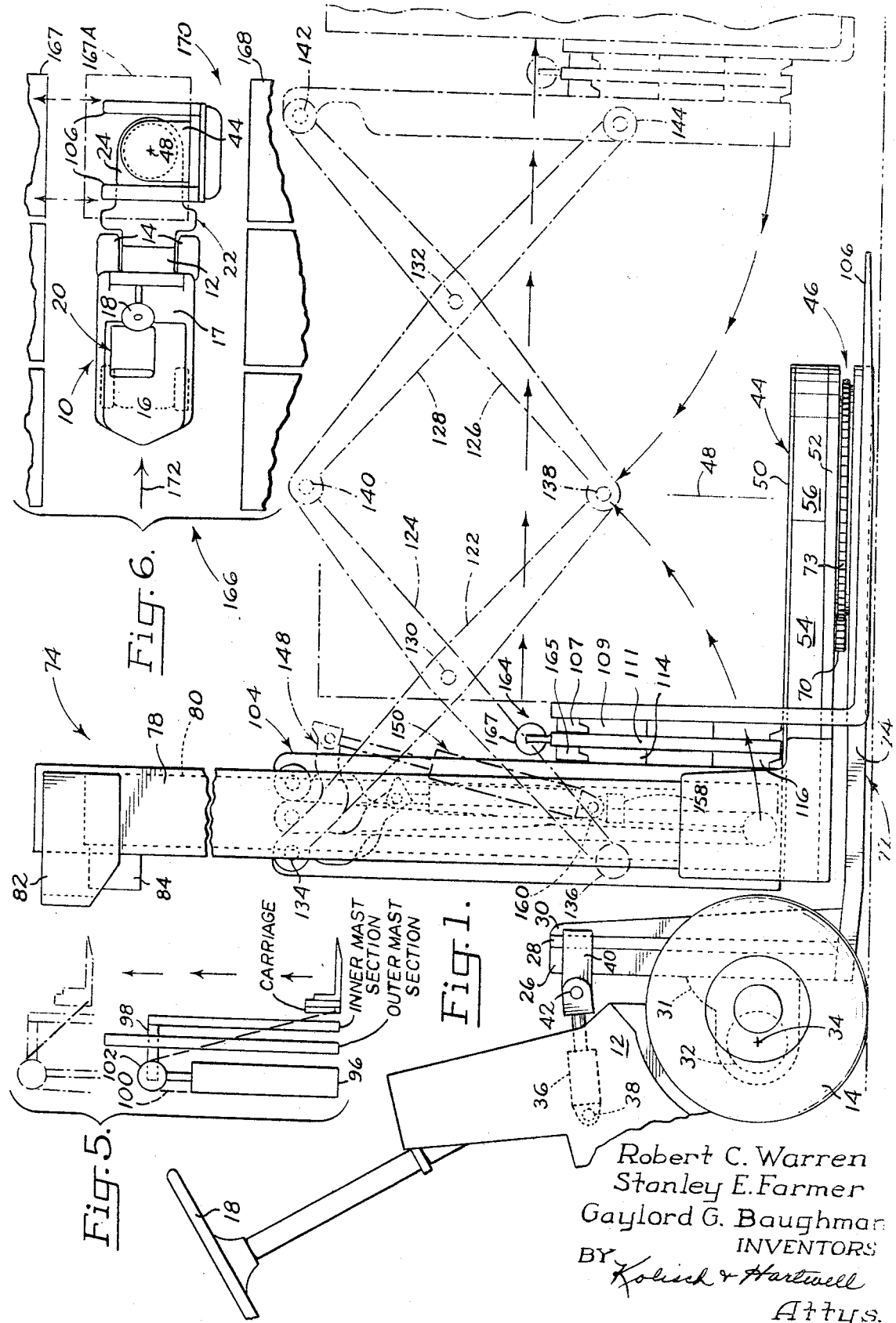

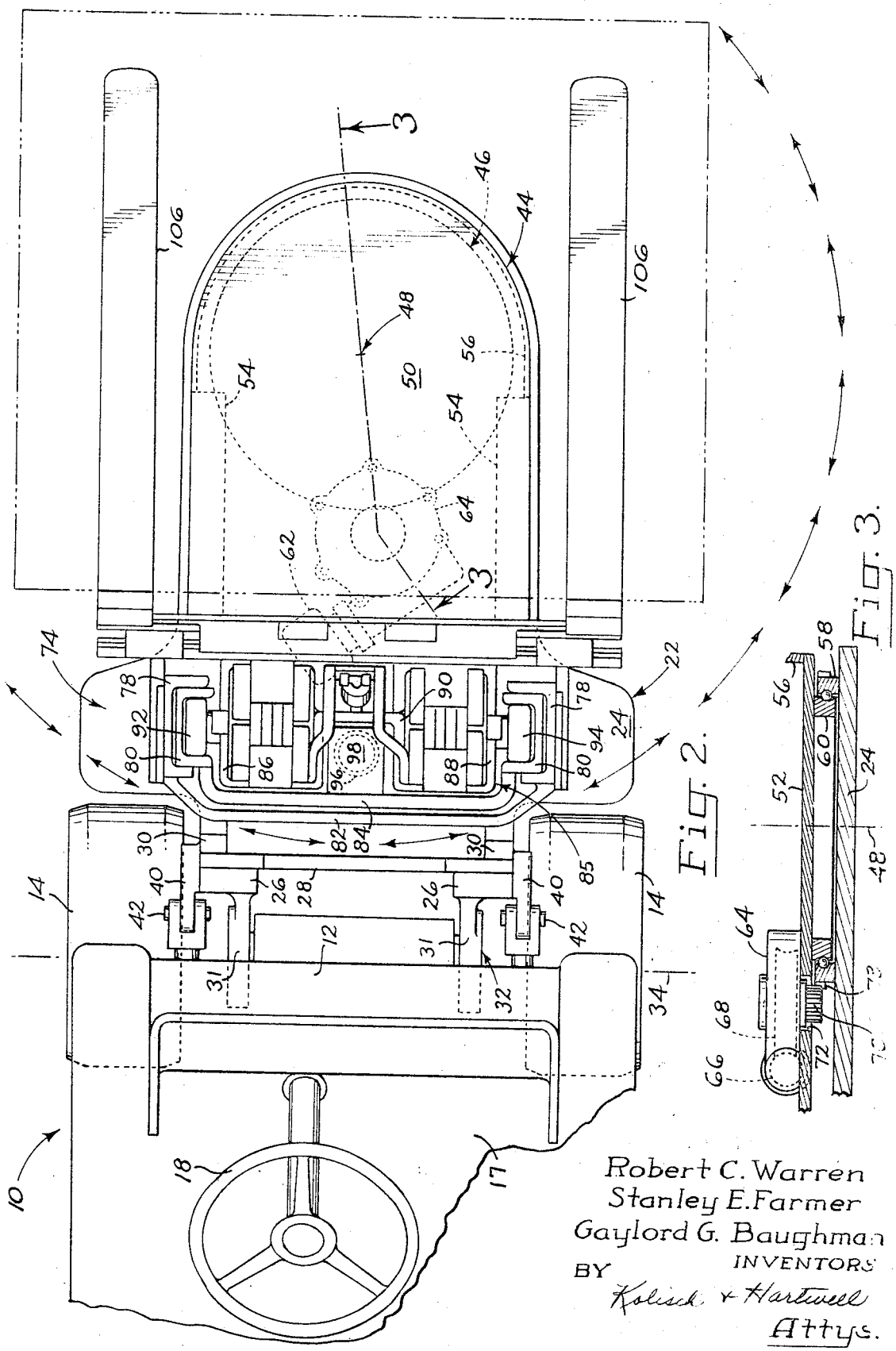

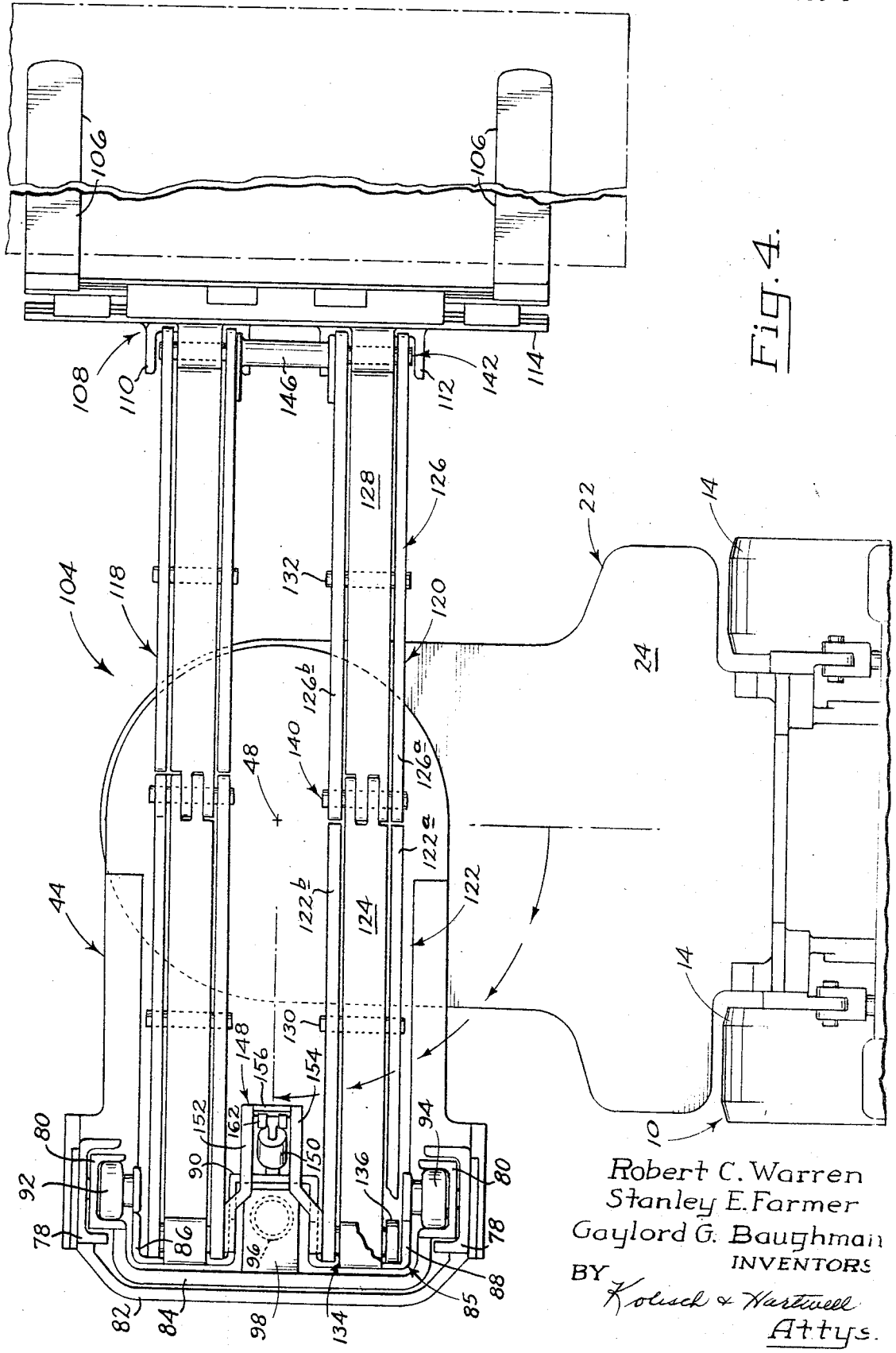

3,521,779
LIFT TRUCK WITH A ROTATING MAST MOUNTED ON A SUBFRAME
Robert C. Warren, Portland, Stanley E. Farmer, Gresham, and Gaylord G. Baughman, Troutdale, Oreg., assignors to Cascade Corporation, Portland, Oreg., a corporation of Oregon
Filed Mar. 18, 1968, Ser. No. 713,815
Int. Cl. B65g 47/00
U.S. Cl. 214—671
8 Claims

ABSTRACT OF THE DISCLOSURE

A lift truck including a wheel-supported vehicle frame, and a subframe disposed adjacent the ground mounted on the vehicle frame and extending forwardly of the wheels that support the frame's forward end. Means mounts the subframe on the vehicle frame enabling its tilting about a horizontal axis extending transversely of the vehicle's longitudinal axis. A turntable on the subframe is rotatable about a substantially upright turn axis. Mounted on the turntable is an upright mast assembly which is disposed in a position offset laterally from the turn axis. A carriage supported on the mast assembly mounts extensible reach mechanism carrying a pair of lift forks. With the reach mechanism contracted, the forks have opposite extremities located on opposite sides of the turn axis, whereby such axis projects up through a load supported on the forks.

---

This invention relates to a lift truck, and more particularly to such a truck which is constructed so as to be able to pick up and discharge a load at a station located to one side of the truck.

The usual industrial lift truck, including a mast assembly and forks supported on its forward end, can only pick up a load when maneuvered to face the station where the load is located. This requires that wide aisles be available for maneuvering, and space devoted to aisles in a warehouse detracts from usable space available for load storage.

Trucks with lift forks which may be set at right angles to the longitudinal axis of the truck have been proposed in the past, but none have been entirely satisfactory. Some require that a load be swung in a wide arc to a position located to one side of the truck and this introduces clearance problems. Many constructions permit the handling of loads only with respect to a station located closely and directly adjacent a side of the truck. The lack of adequate lifting height in the forks has been a disadvantage characterizing other constructions. Perhaps a principal disadvantage of most constructions is their lack of side-to-side stability. The usual lift truck can carry a considerable mass in a position out in front of the truck with the mass of the truck serving to counterbalance the load. However, with the load shifted to one side of the truck, there is a lateral shifting of the center of gravity which is not properly counterbalanced by the truck. This prevents a truck from handling relatively heavy loads, and such a restriction limits the use of the usual sideloading equipment.

A general object of this invention is to provide a novel lift truck which can pick up and discharge a load at a station located to one side of the truck, featuring a construction which takes care of the above-indicated difficulties in a practical and satisfactory manner.

More particularly, an object of the invention is to provide a lift truck characterized by a construction wherein the mast assembly which permits lifting of the load on extension, is swung laterally to a position where it can effectively counterbalance the load with the lifting forks of the truck shifted to a laterally projecting position.

Another object is to provide such a lift truck which permits swinging of the lift forks from a position projecting forwardly to a position projecting laterally of the truck about an axis which projects up through the load being handled. A wide swing axis is not needed, and this feature minimizes clearance difficulties.

A further object is to provide such a lift truck so organized as to enable the lift forks to be raised to a considerable height.

The lift truck of the invention further features extensible reach mechanism mounting the forks on the carriage which is movable on the mast assembly, whereby the forks can be extended out from the truck in the handling of a load. In this way a load can be turned while supported on the forks, about an axis which extends up through the load and then, with the forks extending at right angles to the longitudinal axis of the truck, they may be extended finally to position the load.

Other features and objects of a particular and preferred embodiment of the invention are a construction which offers minimal obstruction to the vision of an operator of the truck, and a construction which is compact. Still another feature is a truck construction which is so organized as to enable the forks, when positioned straight ahead, to be held close to the front wheels of the truck, thus to provide maximum fore and aft stability.

These and other objects and advantages are attained by the invention, and the same will become more fully apparent as the description which follows is read in conjunction with the accompanying drawings, wherein:

FIG. 1 is a fragmentary side elevation illustrating a lift truck constructed according to the invention, with various parts in the truck shown in dash-dot outline in an extended position;

FIG. 2 (second sheet of drawings) is a fragmentary plan view, further illustrating the truck of FIG. 1, and showing a pair of lift forks in the truck oriented to point forwardly from the forward end of the vehicle;

FIG. 3 is a cross-sectional view, taken along the line 3—3 in FIG. 2;

FIG. 4 (third sheet of drawings) is a fragmentary plan view illustrating the truck of FIGS. 1 and 2, with the lift forks in the truck oriented to face laterally to one side of the vehicle, and showing the forks extended toward such side;

FIG. 5 (first sheet of drawings) is a simplified schematic diagram illustrating the operation of an extensible mast assembly employed in the truck herein; and FIG. 6 (first sheet of drawings) is a simplified fragmentary plan view illustrating how the truck proposed herein may be employed in a warehouse to handle packages that are stored in rows.

Turning now to the drawings, and referring first to FIG. 6, indicated generally at 10 is a lift truck as contemplated herein comprising a vehicle frame 12 supported for travel over the ground by means of the usual front and rear wheel assemblies shown at 14 and 16. These are suitably mounted on the vehicle frame, and steering is performed by turning dirigible wheels 16 utilizing steering wheel 18. The usual drive motor housed within housing 17 is operatively connected to the front wheels to power them. An operator's seat is shown at 20.

Mounted on the forward end of the vehicle frame and projecting forwardly from this end adjacent the base of front wheel assemblies 14 is what is referred to herein as a subframe 22. The subframe, and now referring also to FIGS. 1 and 2, includes a forwardly projecting, substantially horizontal extension or plate 24 which is disposed close to the ground. Plate 24, viewed in plan, has a semi-circular outline, as best illustrated in FIGS. 2 and 6, at the forward extremity thereof.

Further describing the subframe, joined to and projecting upwardly from opposite sides of the rear of plate 24 are a pair of laterally spaced upright posts 26. Posts 26 are joined by a cross plate 28 which is braced on plate 24 by a pair of laterally spaced gussets 30.

The subframe is mounted on frame 12 through a pair of laterally spaced brackets 31 joined to posts 26, and a pivot connection, or pivot means, 32 pivoting the brackets to the vehicle frame. The pivot connection described accommodates tilting of the subframe, and any structure carried by the subframe, about a substantially horizontal axis 34 (see FIG. 2) which extends transversely of the longitudinal axis of the truck.

Interposed between the subframe and the vehicle frame are a pair of laterally spaced fluid-operated rams such as the one shown at 36 in FIG. 1. The butt end of a cylinder in a ram is pivoted through a pivot connection 38 to the frame of the vehicle. The outer end of the rod in each ram is connected to a post 26 through a bracket 40 anchored to the post and a pivot connection 42 pivoting the ram rod to the bracket.

Further describing truck 10, at 44 is a turntable mounted on plate 24 in the subframe through a rotator 46 which accommodates turning of the turntable about an upright turn axis 48. The turntable is hollow in construction, and includes upper and lower vertically spaced, planar decks 50, 52, respectively, joined to and spaced by a pair of laterally spaced elongated bars 54 extending part way along opposite sides of the decks. A curved wall 56 also joins with decks 50, 52, and extends between the right ends of bars 54 in FIG. 2.

Considering particularly FIGS. 2 and 3, rotator 46 includes a bearing assembly having an outer race 58 secured to the top face of plate 24 and an inner race 60 sesured to the under surface of deck 52. The rotator further comprises a fluid-operated reversible drive motor 62 (FIG. 2) and a speed-reducing gear box 64. The motor and gear box are suitably mounted on deck 52 of the turntable in the space provided between decks 50, 52 of the turntable. The output shaft of the motor drives a worm gear 66 (FIG. 3) in the gear box, and this worm gear in turn drives a spur gear 68. Gear 68 drives an axially aligned spur gear 70 which extends downwardly through an opening 72 in deck 52 into the space between the deck and plate 24. Gear 70 meshes with a ring gear 73 joined to the cylindrical outside surface of outer race 58. With operation of motor 62, turntable 44 rotates about axis 48, with the motor and gear box 64 moving with the turntable.

Considering again FIGS. 1 and 2, the lift truck further comprises an upright, vertically extensible mast assembly indicated generally at 74. The mast assembly comprises a pair of laterally spaced outer channel members 78 suitably anchored to the turntable, and a pair of inner channel members 80 slidably received within the outer channel members for extension upwardly from the outer channel members. The upper ends of channel members 78 are joined by a cross member 82, and member 82 together with the outer channel members constitute an outer mast section in assembly 74. Similarly, the upper ends of the inner channel members are joined by a cross member 84, and this cross member together with the inner channel members constitute an inner mast section. As can be seen clearly in FIG. 2, cross member 82 bows rearwardly to provide clearance for cross member 84 with vertical movement of the inner mast section. Referring particularly to FIGS. 2 and 4, mounted for vertical movement on channel members 80 in the inner mast section is a carriage 85. The carriage comprises three upright, substantially parallel channel pieces 86, 88, 90. Channel pieces 86, 88 are laterally spaced apart from one another with their recessed sides facing to the right in the figures. Channel piece 90 is positioned centrally between pieces 86, 88, is suitably joined to such pieces, and is disposed with its recessed side facing to the left in the figures. Also forming part of the carriage are rollers, such as rollers 92, 94, suitably journaled on the outer flanges in channel pieces 86, 88, respectively. Such rollers are freely received within the elongated channels that extend along the recessed sides of channel members 80, and guide the carriage for vertical movement on the inner mast section.

Considering now the means provided for raising and lowering the inner mast section, and for moving the carriage vertically thereon, and referring to FIGS. 2 and 5, an upright hydraulic hoist ram is shown at 96. The butt end of the cylinder of ram 96 is suitably supported on the turntable adjacent the base of the mast assembly. The upper end of the rod in the ram is anchored to a bracket 98 which is secured to cross member 84 in the inner mast section. With extension and contraction of ram 96, the inner mast section moves at a unit with the rod in the ram.

The carriage in the mast assembly is raised and lowered by means of chain and pulley mechanism, which has been omitted from FIG. 2 in order to obtain better clarity therein, but which is shown schematically in FIG. 5. Typically, such a mechanism may comprise a pair of laterally spaced chains, such as chain 100, having one set of ends suitably anchored to the cylinder in the hoist ram, and their opposite set of ends suitably fastened to the carriage. Between their ends, the chains may be trained over pulleys, such as pulley 102, which are mounted through the usual cross head on the upper end of the rod in the ram, and which travel with the rod.

In FIG. 5 the carriage, mast sections, and parts in the hoist ram are shown in solid outline in the relative positions that they occupy with the hoist ram contracted. In dash-dot outline, the various parts are shown in the relative positions that they occupy with the ram fully extended. On extending of the hoist ram, the inner mast section is raised directly by the rod of the ram, and at a speed which is the same as the speed at which the rod extends from the ram. The carriage is elevated on the inner mast section through the chains which cause the carriage to rise on the inner mast section at a speed which is twice the speed at which the ram's rod extends.

Further describing truck 10, and referring now particularly to FIGS. 1 and 4, mounted on the carriage through an extensible reach mechanism indicated generally at 104 is a pair of laterally spaced lift forks 106 which form what broadly is referred to as a load-support platform. In FIG. 1, in solid outline, the reach mechanism is shown in a contracted state, with the lift forks positioned closely adjacent the mast assembly and extending forwardly away from frame 12 in the truck. In dash-dot outline, the reach mechanism and forks are shown in positions extended forwardly from the frame of the truck. In FIG. 4, turntable 44 has been swung to a position where the forks are normal to the longitudinal axis of the vehicle, and project out from the right side of the truck in the figure. In addition, the reach mechanism and forks are extended from the mast assembly.

Considering details of the reach mechanism, it comprises a laterally shiftable frame section 108 formed from a pair of upright, laterally spaced channel members 110, 112 joined by a pair of vertically spaced cross members 114, 116 which extend transversely of channel members 110, 112. Channel members 110, 112 are similar to previously mentioned channel pieces 86, 88, and are disposed with their recessed sides directly facing the recessed sides of such channel pieces, respectively.

The reach mechanism further comprises a pair of scissors assemblies 118, 120 which are similar to one another, and which itnerconnect channel piece 86 with channel member 110, and channel piece 88 with channel member 112, respectively. Assembly 120 comprises a pair of rear arms 122, 124, and a pair of front arms 126, 128. As can be seen clearly in FIG. 4, arm 122 is formed from a pair of laterally spaced, parallel bars 122a, 122b that are disposed on opposite sides of arm 124, which is formed as a unitary piece. Arms 122, 124 are pivoted together midway between their opposite ends by a pin 130. Arms 126, 128 are substantially the same in construction as arms 122, 124, respectively, with arm 126 including a pair of laterally spaced bars 126a, 126b corresponding to bars 122a, 122b, respectively. Arms 126, 128 are pivoted together midway between their ends by a pin 132 corresponding to pin 130.

The left end of arm 122 in FIGS. 1 and 4 is pivoted at 134 to the upper end of channel piece 88 in the carriage. The left end of arm 124 carries a pair of laterally spaced rollers, such as roller 136, which ride on the inside face of the web in channel piece 88. The right ends of arms 122, 124 are pivoted at 138, 140, respectively, to the left ends of arms 126, 128 respectively. The right end of arm 126 in FIGS. 1 and 4 is mounted on the upper end of channel member 112 through a pivot connection 142. The right end of arm 128 carries a pair of laterally spaced rollers, such as roller 144 (shown in dash-dot outline in FIG. 1) which correspond to rollers 136 on arm 124. Rollers 144 ride on the inside surface of the web in channel member 112.

In order to prevent skewing of the arms in the scissors assemblies as the same are extended and contracted, a torsion bar 146 is provided which rigidly interconnects the right end of arm 126 and the right end of the corresponding arm in assembly 118.

The scissors assemblies are extended and contracted by means of a crank 148 and a hydraulic ram, or power-operated means, 150. As can be seen in FIG. 4, the crank comprises a pair of laterally spaced arms 152, 154 joined together adjacent their right ends in the figure by a cross bar 156. The left end of arm 154 is suitably anchored to bar 122b in arm 122. The left end of arm 152 similarly is anchored to the part in assembly 118 which corresponds to bar 122b. The butt end of the cylinder in ram 150 is mounted on channel piece 90 in the carriage through a bracket 158 and a pivot connection 160, both of which are shown in dashed outline in FIG. 1. The outer end of the rod in ram 150 is pivoted at 162 (see FIG. 4) to cross bar 156 in crank 148.

Contraction of ram 150 causes contraction of the scissors assemblies, and conversely, extension of the ram causes extension of the assemblies. It will be evident that with extension and contraction of assemblies 118, 120, frame section 108 shifts laterally away from and toward mast assembly 74.

Lift forks 106 include a hook 107 joined to the back sides of the forks in FIG. 1 which fit over a bar 109 joined to a plate 111. This plate is part of a side shift mechanism 164 which is actuatable to produce side shifting of the forks relative to frame section 108 carried at the front of the reach mechanism. Describing further details of this side shift mechanism as illustrated in FIG. 1, joined to the back of plate 111 is a hook 165 mounted for side-to-side sliding movement on cross member 114 already described in connection with frame section 108. A ram 167 is provided for shifting plate 111 laterally as accommodated by sliding movement of hook 165. One end of the ram is suitably mounted on plate 111, and its opposite end is suitably connected to frame section 108. Details of a side shift mechanism similar to the one described may be found in a prior-filed copending application of Robert J. Kroupa, Ser. No. 662,149, filed Aug. 21, 1967, entitled "Side Shift Apparatus for a Lift Truck."

Explaining now how the truck described herein operates, in FIG. 6 there is illustrated at 166 a portion of a warehouse. In the warehouse, palletized loads, such as those shown at 167, 168 are stored in rows which are spaced by aisles, such as aisle 170. To pick up load 167, for example, truck 10 may be advanced forwardly along aisle 170 in the direction of arrow 172. Initially, the turntable in the truck may occupy a position with the mast assembly disposed closely adjacent the front of the truck's frame, with the lift forks lowered and pointing forwardly away from the frame. Reach mechanism 104 is fully contracted. The truck is stopped when it reaches a position relative to load 167 such as that shown in FIG. 6.

Through operation of rotator 46, the turntable may be swung about axis 48 in a counterclockwise direction in FIG. 6 to place the lift forks in a position facing load 167. Should the forks not be properly centered laterally relative to the side of the load facing the aisle, this may be corrected through operation of side-shift mechanism 164.

Ram 150 may then be extended to extend the reach mechanism and forks, whereby the forks shift to positions beneath load 167 in the space provided by the supporting pallet for the load. Hoist ram 96 is then operated to lift the inner mast section, and to raise the carriage, reach mechanism and forks to pick up the load. With the carriage and load elevated, ram 150 is contracted to draw in the reach mechanism, with the forks and load then shifting to a position closely adjacent the mast assembly. Load 167 thereupon shifts to the position where it is shown in phantom outline at 167A in FIG. 6, and in this position, the load is approximately centered on turn axis 48. With operation of the turntable and contraction of the hoist ram, the lift forks may then be positioned closely adjacent the turntable and with lift forks facing forwardly.

To prevent the possibility of a load slipping forwardly off the outer ends of the lift forks, subframe 22 may be tilted whereby the outer ends of the forks become elevated relative to the inner ends.

As best seen in FIGS. 1 and 2, the mast assembly is supported in a position which is laterally offset from turn axis 48. The forks, with the reach mechanism contracted, have one set of ends adjacent the mast assembly and located on one side of the turn axis, and extend from the mast assembly to an opposite set of ends or extremities located on the opposite side of the turn axis 48. Because of this, when a load is supported on the forks, the turn axis extends upwardly through the load.

It will be noted that the lift truck described has a number of advantages making it a practical vehicle to use where aisle space is limited and serving to distinguish the truck from prior known units.

Of principal importance is the fact that the mast assembly and associated parts are mounted on the turntable at a point offset from the turn axis. With such the case, when the forks are shifted to be pointed toward one side of the vehicle, the mast assembly swings to the opposite side of the vehicle to a position where it can counterbalance any load handled which is located toward the side of the vehicle at which the forks are pointed. As a consequence, the truck is permitted to handle considerably heavier loads than could be handled by prior known constructions.

Another very important result of the type of organization contemplated is that minimum clearance is necessary in swinging a load and the forks from a position where the forks project straight ahead to a position where the forks extend laterally. Commonly, units which carry forks projecting from one end of the vehicle, and where side positioning of the forks is permitted, rely on swinging the forks about an axis which is located somewhat rearwardly of the rear ends of the forks. The load thus is required to swing through a wide arc, and this is a distinct disadvantage where space is limited.

With the type of truck contemplated, the vertical clearance required for the truck is no greater than that of the usual lift truck, and the height to which a load may be lifted is comparable to the height obtainable in a normal lift truck. The construction, in other words, does not interfere with the elevating capability of the truck.

The inclusion of the reach mechanism, of course, permits a load to be deposited on one side of the lift truck without having the load swing in a wide arc to reach such position on the one side of the truck. The reach mechanism has the further advantage of increasing flexibility of use, in that the extent to which the forks are projected out to one side of the truck is variable. The reach mechanism has further utility when the forks are positioned in their normal straight ahead position in picking up loads spaced some distance from the mast assembly. With the reach mechanism on the carriage and thus elevatable with the carriage, the extensibility of the forks is present whether the forks are at a high or low elevation.

It will be noted that in the particular embodiment of the invention described, the uprights of the outer stationary mast section are located somewhat inwardly of the outer sides of the wheels in the wheel assemblies, as best seen in FIG. 2. This reduces the amount of space which need be provided to permit the mast assembly to clear the fore extremities of the vehicle on turning of the turntable. As a corollary, such construction permits turn axis 48 to be positioned not too far forwardly of the forward end of the vehicle. Thus, an overall compactness is achieved which enables the truck to have requisite fore and aft stability.

The relatively close spacing of the outer uprights in the outer mast section also is beneficial in providing proper visibility for the lift truck operator. Generally speaking, it is desirable if a lift truck operator can see the tips of his forks when handling the vehicle. With conventional trucks, the tips of the forks are, for the most part, obstructed to an operator. However, in the truck proposed herein, with the scissor mechanisms of the reach mechanism located laterally inwardly of the inner mast section, an operator looking past the mast assembly is afforded good visibility.

It is preferable that the forward portion of the turntable and that the subframe where it supports the turntable have a side-to-side dimension which is less than the lateral spacing of the lift forks. This enables the forks to be lowered to a position straddling the turntable and subframe, as shown in FIGS. 1 and 2, to be positioned the closest possible distance to the floor in proper placement for direct forward extension under a low load.

While the side shift mechanism permitting lateral shifting of the forks with respect to their mounting has some advantages in connection with the handling of loads positioned in front of the truck, its principal advantage probably arises in obtaining proper placement of the forks in handling of loads positioned to one side of the truck. Thus, an operator can produce minor lateral adjustments without having to rely upon inching his vehicle backward or forward, which may be difficult under certain circumstances.

While there has been described a preferred embodiment of the invention, obviously changes are possible without departing from the inventive concepts involved.

It is claimed and desired to secure by Letters Patent:

1. In combination with a vehicle including a frame and forward and rear wheel means supporting front and rear ends of the vehicle, a subframe mounted at the front end of said vehicle frame including a forwardly projecting extension which extends forwardly from the front of the vehicle from adjacent the base of said forward wheel means, a turntable mounted on said forwardly projecting extension of said subframe for rotation about an upright turn axis which is disposed in front of said forward wheel means, an upright mast assembly including a pair of laterally spaced uprights and a vertically movable carriage mounted on said turntable at a location spaced radially from said turn axis, said mast assembly with the turntable in one position being located between said forward wheel means and said turn axis, a drive motor for the vehicle disposed rearwardly of said forward wheel means with the mass thereof counterbalancing the mass of said extension, turntable, and mass assembly, means forming a load-support platform projecting forwardly from said mast assembly toward said turn axis with said turntable in its said one position, said means forming said load-support platform comprising a pair of laterally spaced, substantially horizontally disposed lift forks located entirely forwardly of said spaced uprights, one lift fork being disposed laterally to one side of the turntable and the other lift fork being disposed laterally to the other side of the turntable, said forks with the carriage in a lowered position having a position straddling said turntable and being disposed at an elevation below the top of said turntable, and extensible reach mechanism mounting said means forming said load-support platform on said mast assembly, said reach mechanism having an extensibility sufficient to place said means forming said load-support platform beyond said turntable from said mast assembly, said turntable being rotatable about said turn axis to place the mast assembly on one side of the vehicle with the means forming said load-support platform on extension of said reach mechanism then being positionable beyond the turntable toward the other side of the vehicle.

2. The combination of claim 1, wherein pivot means is interposed between the vehicle frame and mast assembly accommodating tilting of the mast assembly 3. The combination of claim 1, wherein said subframe is mounted on said vehicle frame through pivot means accommodating pivoting of the subframe about a substantially horizontal axis which extends transversely of said one end of said vehicle frame whereby the mast is tilted.

4. The combination of claim 1, wherein said wheel means supporting said one end of the frame comprises a pair of laterally spaced wheels located adjacent the forward end of said vehicle frame, and said mast assembly comprises a pair of laterally spaced uprights, said uprights being disposed inwardly of the outer sides of said wheels.

5. The combination of claim 4, wherein said reach mechanism is disposed laterally inwardly of said uprights.

6. The combination of claim 5, wherein said reach mechanism comprises an extensible scissors assembly, and power-operated means for extending and contracting said scissors assembly.

7. The combination of claim 1, wherein said load-support platform is mounted on said reach mechanism through side-shift mechanism which is operable to shift the platform laterally relative to said reach mechanism.

8. The combination of claim 1, wherein means is included interposed between the forks and the vehicle accommodating adjustment of the position of the forks between a substantially horizontal position and a more inclined position where the forks incline upwardly progressing from the mast assembly.

(References on following page)

References Cited

UNITED STATES PATENTS

| | | | |
|---|---|---|---|
| 3,082,894 | 3/1963 | Gibson | 214—730 |
| 3,211,314 | 10/1965 | Ulinski | 214—730 |
| 3,216,598 | 11/1965 | McKee et al. | 214—730 |
| 3,219,210 | 11/1965 | Loef | 214—730 XR |
| 3,373,886 | 3/1968 | Ulinski | 214—730 |

FOREIGN PATENTS 946,691  1/1964  Great Britain.

GERALD M. FORLENZA, Primary Examiner

R. B. JOHNSON, Assistant Examiner

U.S. Cl. X.R.

214—730